US006769312B2

(12) United States Patent
Meyer et al.

(10) Patent No.: US 6,769,312 B2
(45) Date of Patent: Aug. 3, 2004

(54) MULTI-AXIS LOAD CELL BODY

(75) Inventors: Richard A. Meyer, Chaska, MN (US); Alan J. Kempainen, Waconia, MN (US); Douglas J. Olson, Plymouth, MN (US)

(73) Assignee: MTS Systems Corporation, Eden Priarie, MN (US)

( * ) Notice: Subject to any disclaimer, the term of this patent is extended or adjusted under 35 U.S.C. 154(b) by 0 days.

(21) Appl. No.: 09/907,228

(22) Filed: Jul. 17, 2001

(65) Prior Publication Data

US 2002/0059837 A1 May 23, 2002

Related U.S. Application Data

(60) Provisional application No. 60/252,866, filed on Nov. 22, 2000.

(51) Int. Cl.[7] .................................................. G01D 7/00
(52) U.S. Cl. ................................................ 73/862.042
(58) Field of Search ..................... 73/862.041, 862.042, 73/862.043, 862.044, 862.045, 146

(56) References Cited

U.S. PATENT DOCUMENTS

| 3,377,849 A | | 4/1968 | Lebow ........................ 73/134 |
| 3,618,376 A | * | 11/1971 | Shull et al. ............. 73/862.044 |
| 3,693,425 A | | 9/1972 | Starita et al. ................. 73/133 |
| 3,771,359 A | | 11/1973 | Shoberg .................... 73/141 A |
| 3,780,573 A | | 12/1973 | Reus ........................... 73/146 |
| 3,867,838 A | | 2/1975 | Gerresheim ............... 73/133 R |
| 3,939,704 A | | 2/1976 | Zipin .......................... 73/133 |
| 4,023,404 A | | 5/1977 | Brendel ..................... 73/133 R |
| 4,171,641 A | | 10/1979 | Landsness .................... 73/146 |
| 4,297,877 A | | 11/1981 | Stahl ........................... 73/146 |
| 4,448,083 A | | 5/1984 | Hayashi .................... 73/862.04 |
| 4,483,203 A | | 11/1984 | Capper .................... 73/862.04 |
| 4,488,441 A | | 12/1984 | Ramming ................ 73/862.04 |
| 4,493,220 A | | 1/1985 | Carignan et al. ......... 73/862.04 |
| 4,499,759 A | | 2/1985 | Hull ............................ 73/146 |
| 4,550,617 A | | 11/1985 | Fraignier et al. ......... 73/862.04 |
| 4,573,362 A | | 3/1986 | Amlani .................... 73/862.04 |
| 4,640,138 A | | 2/1987 | Meyer et al. ............. 73/862.04 |
| 4,672,855 A | | 6/1987 | Schmieder ............... 73/862.04 |
| 4,748,844 A | | 6/1988 | Yoshikawa et al. ........... 73/146 |
| 4,763,531 A | | 8/1988 | Dietrich et al. .......... 73/862.04 |
| 4,821,582 A | | 4/1989 | Meyer et al. ............. 73/862.04 |
| 4,823,618 A | | 4/1989 | Ramming ................. 73/862.04 |
| 5,313,828 A | | 5/1994 | Kötzle et al. ................. 73/146 |
| 5,315,882 A | | 5/1994 | Meyer et al. ........... 73/862.044 |
| 5,400,661 A | | 3/1995 | Cook et al. ............ 73/862.043 |
| 5,540,108 A | | 7/1996 | Cook et al. .............. 73/862.01 |
| 5,894,094 A | | 4/1999 | Kuchler et al. ........ 73/862.044 |
| 5,969,268 A | * | 10/1999 | Sommerfeld et al. .. 73/862.041 |

FOREIGN PATENT DOCUMENTS

| DE | 2 302 540 | 7/1974 |
| DE | 3313960 A1 | 10/1983 |
| EP | 0816817 A2 | 1/1998 |
| GB | 2 096 777 A | 10/1982 |

OTHER PUBLICATIONS

Assembly drawing of Swift™ load cell sold by MTS Systems Corporation prior to Nov. 22, 1999.

JSAE Review, Official Journal of the Society of Automotive Engineers of Japan, Inc., vol. 16, 1995, pp. 83–89.

(List continued on next page.)

Primary Examiner—Edward Lefkowitz
Assistant Examiner—Corey Mack
(74) Attorney, Agent, or Firm—Westman, Champlin & Kelly, P.A.; S. Koehler

(57) ABSTRACT

A load cell comprises two rings having at least three tubes extending from the first ring to the second ring. Sensors are mounted on the tubes to measure strain of the load cell body in a plurality of directions. The load cell can further be mounted on a vehicle spindle to measure forces and moments of a wheel assembly at the spindle as a vehicle is operated.

27 Claims, 15 Drawing Sheets-

OTHER PUBLICATIONS

Milton J. Lebow, "Summer Instrument–Automation Conference and Exhibit —Toronto, Ontario, Canada", Instrument Society of America Conference Preprint, Jun. 5–8, 1961.

G. Hirzinger, "Direct Digital Robot Control Using A Force–Torque–Sensor", IFAC Symposium on Real Time Digital Control Applications, Guadalajara, Mexico, Jan. 15–21, 1983.

Wurll, "Tactile Force–Torque Sensor for Performing Control Tasks in Robotics", XP002210941, vol. 15, No. 3, pp. 120–125, 1986.

Assorted Astek Engineering, Inc. brochures, 1983.

A. Rupp, W. Diefenbach, V. Grubisic, "Erfassung der mehraxialen Fahrbetriebsbelastungen mit dem MeBrad 'VELOS'", ATZ Automobiltechnische Zeitschrift 96, 1994, pp. 764–768.

A. Rupp, V. Grubisic, "Reliable and Efficient Measurement of Suspension Loads on Passenger Cars and Commericial Vehicles", reprint from "Advanced Measurement Techniques and Sensory Systems for Automotive Applications: Accuracy and Reliability", Proceedings of the 1st International Conference and Exhibition, Ancona 29–30.6. 1995, Hrsg. ATA Orbassano (1995), S. 263–273.

Brochure: Wheel force transducer—the key for real world simulation , Schenck ATC, 4/95.

"Flexible Wheel Force Transducer System for Road Load Data Acquisition", IGEB, 4/95.

TML pam E–670 A: "TML 6–Component Wheel Force Measuring Equipment SLW–A/MFT–106", Texas Measurements, Inc.

"Unique Solutions to Measurement Problems", Robert A. Denton, Inc.

"MMS–6800", Nissho Electric Works, Col. Ltd.

T. Liang et al., "Transducer for Surface Force Measurement", Agricultural Engineering, vol. 46, No. 1112, Dec. 1965, St. Joseph, US, pp. 688–691.

Broucher: "Kistler Vehicle Engineering News", 5/97.

Walter Weiblen, Thomas Hofmann, "Evalution of Different Designs of Wheel Force Transducers", SAE Technical Paper Series, International Congress and Exposition, Feb. 23–26, 1998, pp. 1–10.

* cited by examiner

MULTI-AXIS LOAD CELL BODY

CROSS-REFERENCE TO RELATED APPLICATION

The present application is based on and claims the benefit of U.S. provisional patent application Ser. No. 60/252,866, filed Nov. 22, 2000, the content of which is hereby incorporated by reference in its entirety.

BACKGROUND OF THE INVENTION

The present invention relates to a load cell that transmits and measures linear forces along and moments about three orthogonal axes. More particularly, a compact load cell body suitable for application as a wheel force transducer is disclosed.

Wheel force transducer or load cells for measuring forces along or moments about three orthogonal axes are known. The wheel force transducer typically is mounted between and to a vehicle spindle and a portion of a vehicle rim. The transducer measures forces and moments reacted through a wheel assembly at the spindle as the vehicle is operated.

One form of a wheel force transducer that has enjoyed substantial success and critical acclaim has been the Swift® transducer sold by MTS Systems Corporation of Eden Prairie, Minn. and is described in detail in U.S. Pat. Nos. 5,969,268 and 6,038,933. Generally, this transducer includes a load cell body having a rigid central member, a rigid annular ring and a plurality of tubular members extending radially and joining the central member to the annular ring. A plurality of sensing circuits are mounted to the plurality of tubular members. The rigid central member is mounted to the vehicle spindle, while the annular ring is attached to the vehicle rim. An encoder measures the angular position of the load cell body allowing the forces transmitted through the radial tubular members to be resolved with respect to an orthogonal stationary coordinate system.

Although the Swift® transducer is well suited for measuring loads reacted through the vehicle spindle on a vehicle such as passenger cars, the load cell cannot generally be used on a large vehicle such as an over-the-road truck due to a large spindle diameter on the truck leaving little clearance between the spindle and the tire rim.

There is thus an on-going need to provide an improved compact load cell, which can be used on large vehicles and is yet easy to manufacture.

SUMMARY OF THE INVENTION

One embodiment of the present invention is a load cell body for transmitting forces and moments in a plurality of directions. The load cell body is an integral assembly having a first ring member and a second ring member. Each ring member has a central aperture centered on a reference axis. Three or more tubes extend from the first ring member to the second ring member parallel to the reference axis.

Another embodiment includes a wheel force load cell body for transmitting forces in a plurality of directions. The wheel force load cell body has an integral assembly with first and second ring members. Each ring member has a central aperture centered on a reference axis. In addition, at least three tubes extend from the first ring member to the second ring member parallel to the reference axis. The wheel force load cell body also includes a mounting hub with first and second annular rims. The mounting hub also has a cylindrical support extending between the first and second rims.

Yet another aspect of the present invention includes a method of making a load cell body. The method includes fabricating from a single block of material an integral assembly having a first annular ring, a second annular ring and a plurality of members spanning therebetween. Each includes a central aperture centered on a reference axis. The method further includes forming a bore within each member, wherein each bore is aligned with an aperture in at least one of the annular rings.

DETAILED DESCRIPTION OF THE ILLUSTRATIVE EMBODIMENTS

Figure 1A:
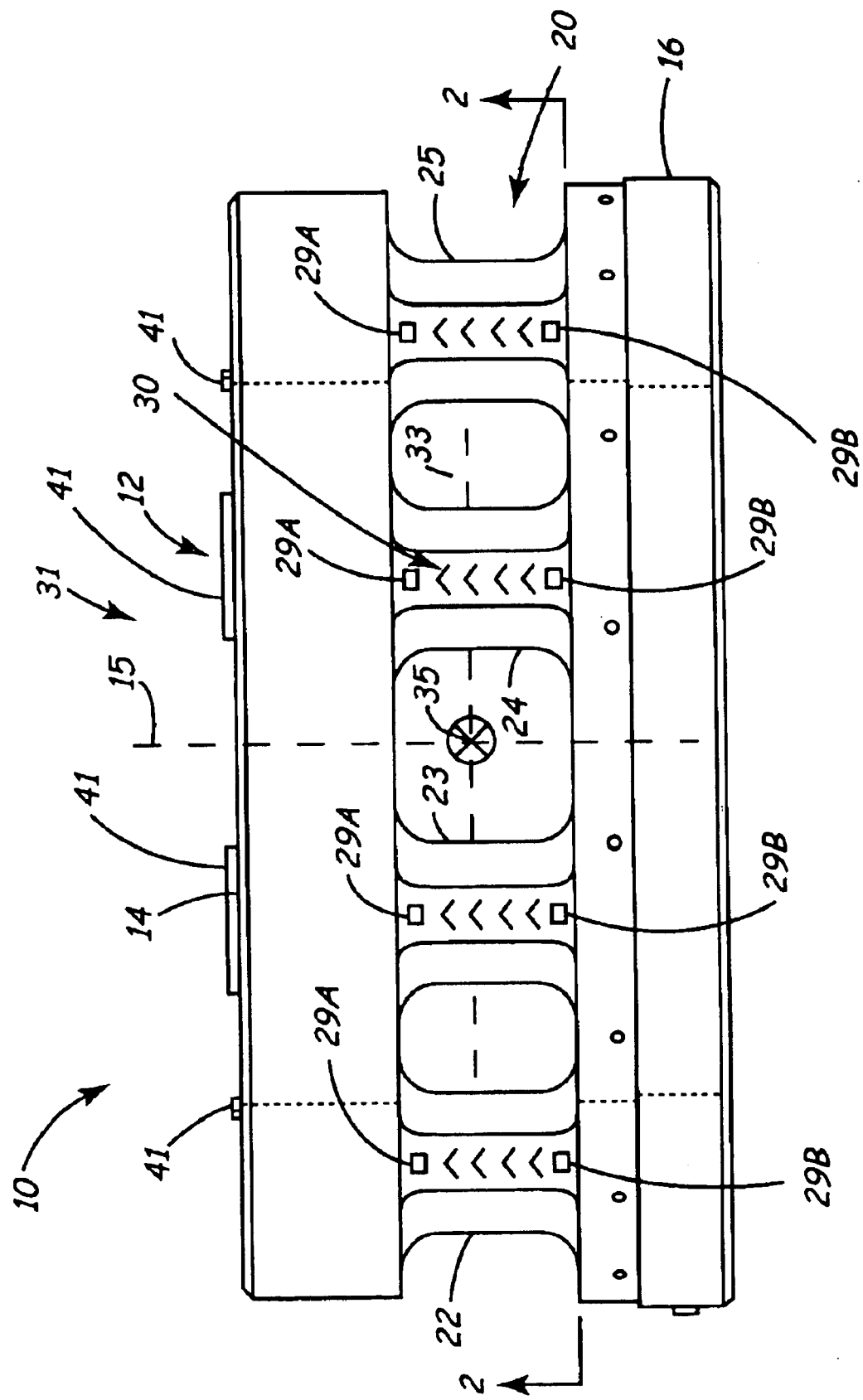
FIG. 1A is a side elevational view of a load cell in accordance with the present invention.
Figure 1B:
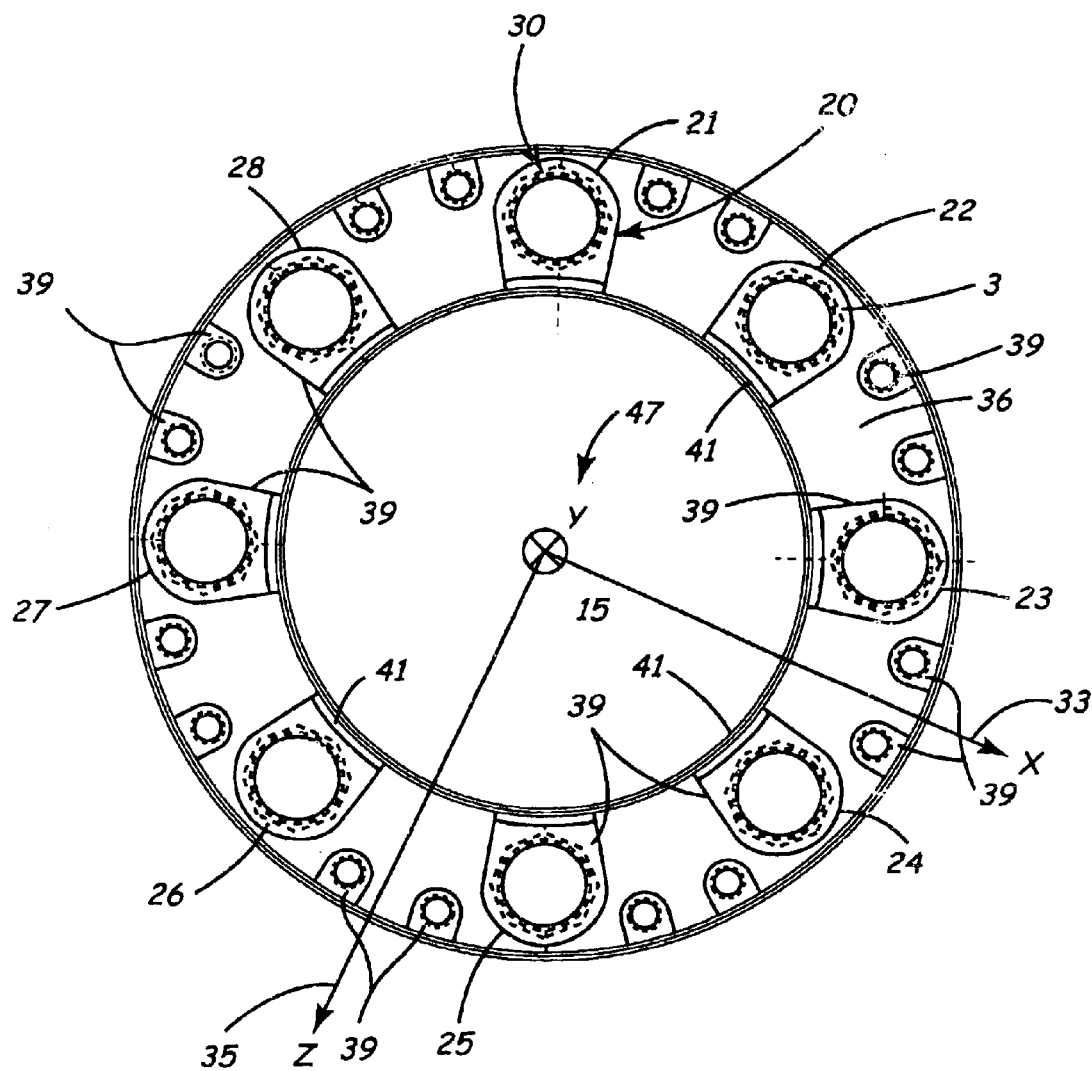
FIG. 1B is a rear elevational view of the load cell illustrated in FIG. 1A.

FIGS. 1A and 1B illustrate a first embodiment of a load cell 10 of the present invention. The load cell 10 preferably includes an integral body 12 fabricated from a single block of material. The body 12 includes a first rigid annular ring 14 and a second annular ring 16 that is parallel and aligned with the first annular ring 14 so as to be centered about a common axis 15. A plurality of tubes 20 join the first annular ring 14 to the second annular ring 16. In the embodiment illustrated, the plurality of tubes 20 comprise eight tubes 21, 22, 23, 24, 25, 26, 27 and 28. Each of the tubes 21–28 extend from the first annular ring 14 to the second annular ring 16 parallel to the axis 15. Although illustrated wherein the plurality of tubes 20 equals eight, it should be understood that any number of tubes three or more can be used to join the first annular ring 14 to the second annular ring 16. In the embodiment illustrated, the plurality of tubes 20 are spaced at substantially equal angular intervals about the axis 15.

A plurality of sensors 30 are mounted on the plurality of tubes 20 to sense strain therein. In the embodiment illustrated, sixty-four strain gauges are incorporated in sixteen Wheatstone bridges, wherein two Wheatstone bridges are provided for each tube 21–28. The sixteen Wheatstone bridges are combined into eight strain gauge signals that are provided as an output from the load cell 10. For purposes of explanation, an orthogonal coordinate system 31 can be defined wherein an X-axis is indicated at 33, a Z-axis is indicated at 35, and a Y-axis corresponds to the central axis 15. The eight strain gauge signals from the load cell 10, as explained below, are used to calculate forces along and about the X-axis 33, the Y-axis 15 and the Z-axis 35.

Generally, measurement of the forces along the X-axis 33 and the Z-axis 35 are measured from sensors in shear; forces along the Y-axis 15 are measured from sensors in axial tension/compression (preferably both axial and Poisson gauges are provided in the bridge); moments about the central axis 15 are measured from sensors in shear; and moments about the X-axis 33 and the Z-axis 35 are measured from sensors in differential axial strain. Each tube 21–28 includes strain sensors, preferably, mounted approximately at the center of the longitudinal length of each tube. Although strain sensors are mounted conventionally to provide an output signal indicative of shear stresses (e.g. sensors 29A and/or sensors 29B indicated in FIG. 1A) in the walls of the plurality of tubes 20, other forms of sensors such as those that provide an indication of bending stresses can also be used as appreciated by those skilled in the art such sensors being mounted at the transitions from the tubes 20 to the rings 14 and 16. In addition, the plurality of sensors 30 comprise resistive strain gauges in the embodiment illustrated; however, other forms of sensing devices such as optically based sensors or capacitively based sensors can also be used.

Figure 2A:
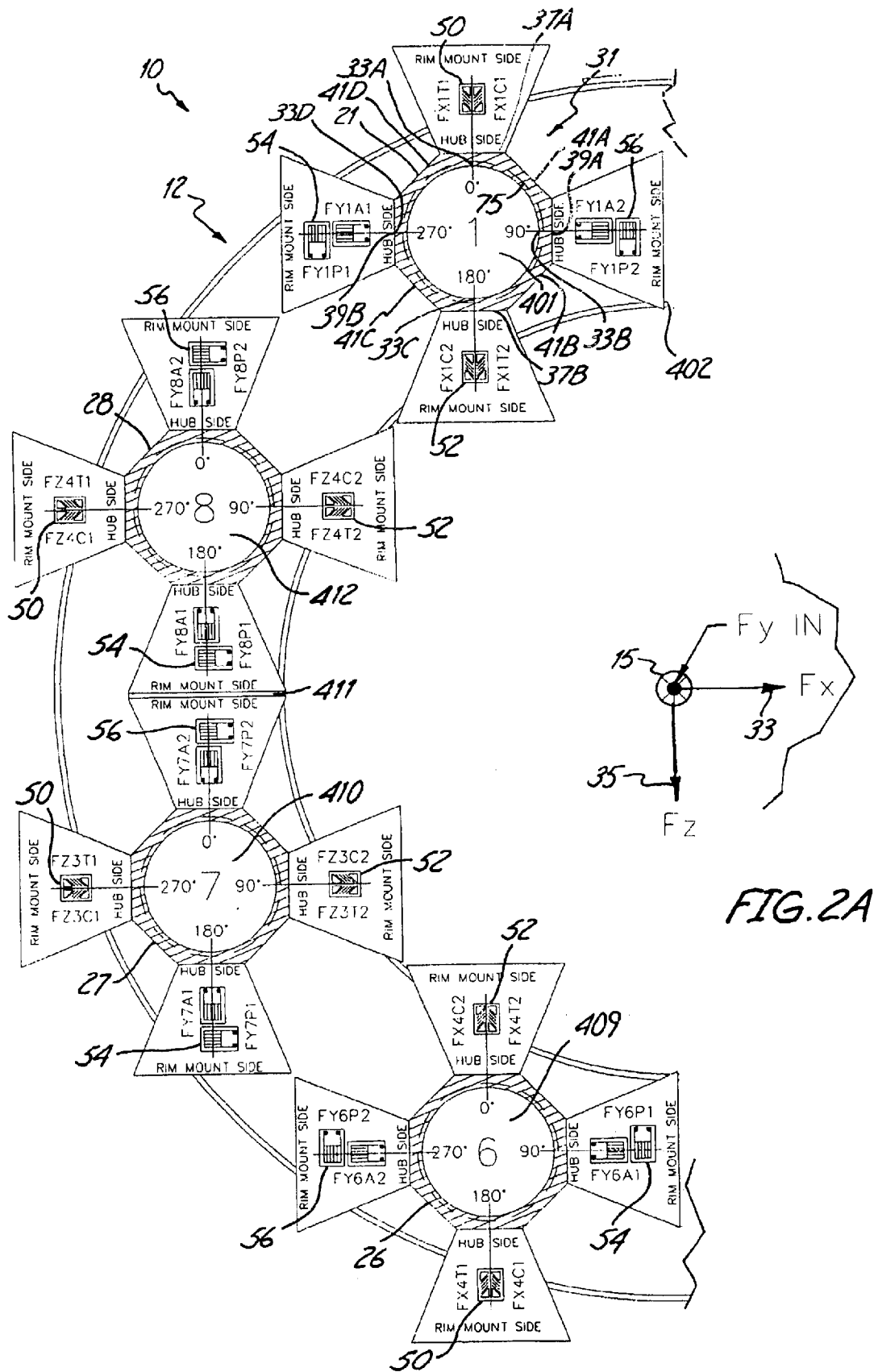
FIGS. 2A and 2B are sectional views taken along line 2—2 of FIG. 1A and include schematic diagrams illustrating placement of sensors on the load cell.
Figure 2B:
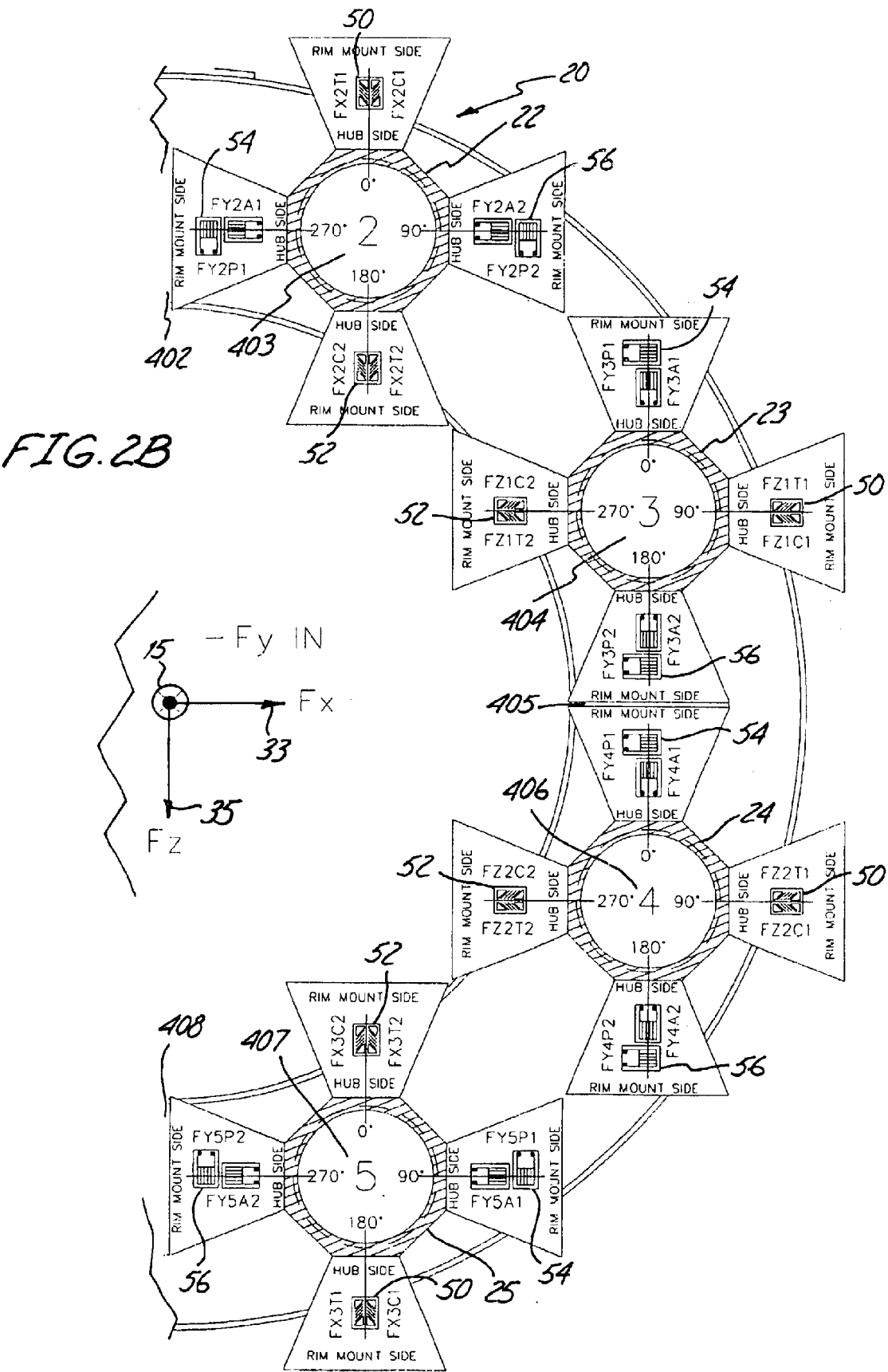

In a preferred embodiment, each of the tubes 21–28 includes a plurality of spaced-apart wall portions of reduced thickness to concentrate stress therein. Referring to FIGS. 2A and 2B and tube 21 (FIG. 2A) by way of example, the tube 21 has a non-rectangular outer surface 31 wherein the wall portions of reduced thickness are indicated at 33A, 33B, 33C and 33D. The wall portions of reduced thickness 33A–33D are formed by a cylindrical bore 75 in the tube 21 and a first pair of parallel planar surfaces 37A and 37B facing in opposite directions and a second set of planar surfaces 39A and 39B also facing in opposite directions. The second set of planar surfaces 39A and 39B are substantially orthogonal to the first set of planar surfaces 37A and 37B such that the planar surfaces of the first set and the second set are alternately disposed about the corresponding longitudinal axis of tube 21. Although illustrated wherein the thickness of the portions 33A–33D are approximately equal, if desired, the thickness can be made different to provide desired sensitivity in selected directions. Preferably, the thickness of portion 33A should be approximately equal to portion 33C, and the thickness of portion 33B should be approximately equal to portion 33D.

The strain sensors are mounted on the first pair of parallel planar surfaces 37A and 37B and the second set of planar surfaces 39A and 39B. Planar mounting surfaces can be advantageous because measured output signals have lower hysteresis and lower creep gauge bonding due to uniform gauge clamp pressure on flat surfaces versus curved mounting surfaces, which locks residue stress in gauge. Also, alignment scribing and affixing of the gauges to the scribed lines is more difficult on a curved surface. The non-rectangular outer surface 31 is also beneficial because this form concentrates stress in portions of the tube 21, which are proximate the strain sensors. Although a tube having a rectangular cross-section (four flat surfaces that intersect at the corners) can be used, significant stress concentration occurs at the intersection of the flat surfaces where strain sensors cannot be easily mounted. Thus, performance is substantially reduced. In contrast, the non-rectangular tube 21 illustrated in FIG. 2A includes planar surfaces 41A, 41B, 41C and 41D that extend between each planar surface of the first set and the successive planar surface of the second set. In a preferred embodiment, the planar surfaces 37A, 37B, 39A, 39B and 41A–41D preferably form an octagon in cross-section. Forming each of the tubes 21–24 with an octagonal outer surface 31 simplifies construction and reduces manufacturing costs since the planar surfaces can be easily machined. Although illustrated wherein one planar surface extends between each planar surface of the first set and successive surface of the second set, for example, planar surface 41A, it should be understood that a plurality of intervening planar surfaces can be used. Similarly, the flat planar surfaces 41A–41D can be replaced with curved wall portions to form a non-rectangular tube. Such a tubular structure does not have an annular wall of uniform thickness, but rather the spaced-apart portions of reduced wall thickness 33A–33D again created by the flat surfaces 37A, 37B, 39A and 39B concentrate stress therein similar to the octagonal cross-section.

It should also be understood that different structures for the plurality of tubes 20 may be used in the load cell body. For example, outer surfaces of the plurality of tubes 20 may be constructed with concave outer surfaces similar to those described in U.S. patent application Ser. No. 09/518,290, filed on Mar. 3, 2000, entitled "Multi-Axis Load Cell", which is hereby incorporated by reference. In particular, the wall portions of reduced thickness 33A, 33B, 33C and 33D would each include an outer concave surface. As used herein, "concave" is not limited to a portion of an inner surface of a hollow sphere, but includes all outwardly opening curved surfaces, for example, cylindrical, parabolic, elliptical, etc. The wall portions of reduced thickness 33A–33D are formed by a cylindrical bore in the radial tube and a first pair of concave outer surfaces (similarly disposed as surfaces 37A and 37B) facing in opposite directions and a second set of concave outer surfaces (similarly disposed as surfaces 39A and 39B) also facing in opposite directions. Use of the concave outer surfaces and the straight bores can have the advantage of providing gradual stress concentration to the wall portions of reduced thickness. In addition, since the thickness of the walls from the wall portions of reduced thickness increases greatly over a small distance from the portions of reduced thickness, the structure is stiffer for overturning moments.

The load cell body 12 can be manufactured from aluminum, titanium, 4340 steel, 17-4 pH stainless steel or other high-strength materials.

FIGS. 2A, 2B, 3A and 3B illustrate location and connection of the strain gauges into the sixteen Wheatstone bridges mentioned above. Generally, each tube includes a first pair of strain sensors 50 provided on a first portion (surface 37A) of each tube 21–28. A second pair of strain sensors 52 is provided on a second portion (surface 37B) approximately 180 degrees from the first pair of strain sensors 50. The first and second pairs of strain sensors on each tube 21–28 are connected in a conventional Wheatstone bridge to form a first sensing circuit on each tube 21–28. The first Wheatstone bridge senses forces along one of the axes 33 or 35. Specifically, in the embodiment illustrated, forces along the X-axis 33 are calculated from output signals from the first Wheatstone bridge provided on each of the tubes 21, 22, 25 and 26. Similarly, output signals from the first Wheatstone bridge on each of the tubes 23, 24, 27 and 28 are used to calculate forces along the Z-axis 35. Each of the first Wheatstone bridge circuits are shear sensing circuits. A second sensing circuit on each of the tubes 21–28 sense axial tension/compression along the Y-axis 15. Each of the second Wheatstone bridge circuit includes a third pair of sensors 54 mounted on a third portion (surface 39B) approximately 90 degrees from the first pair of sensors 50, while a fourth pair of sensors 56 is mounted on a fourth portion (surface 39A) approximately 180 degrees from the third pair of sensors 54. In the embodiment illustrated, two poisson gauges in each of the second Wheatstone bridges (axial bridges) are not fully active like all of the sensors in the first Wheatstone bridges (shear bridges).

Figure 3A:
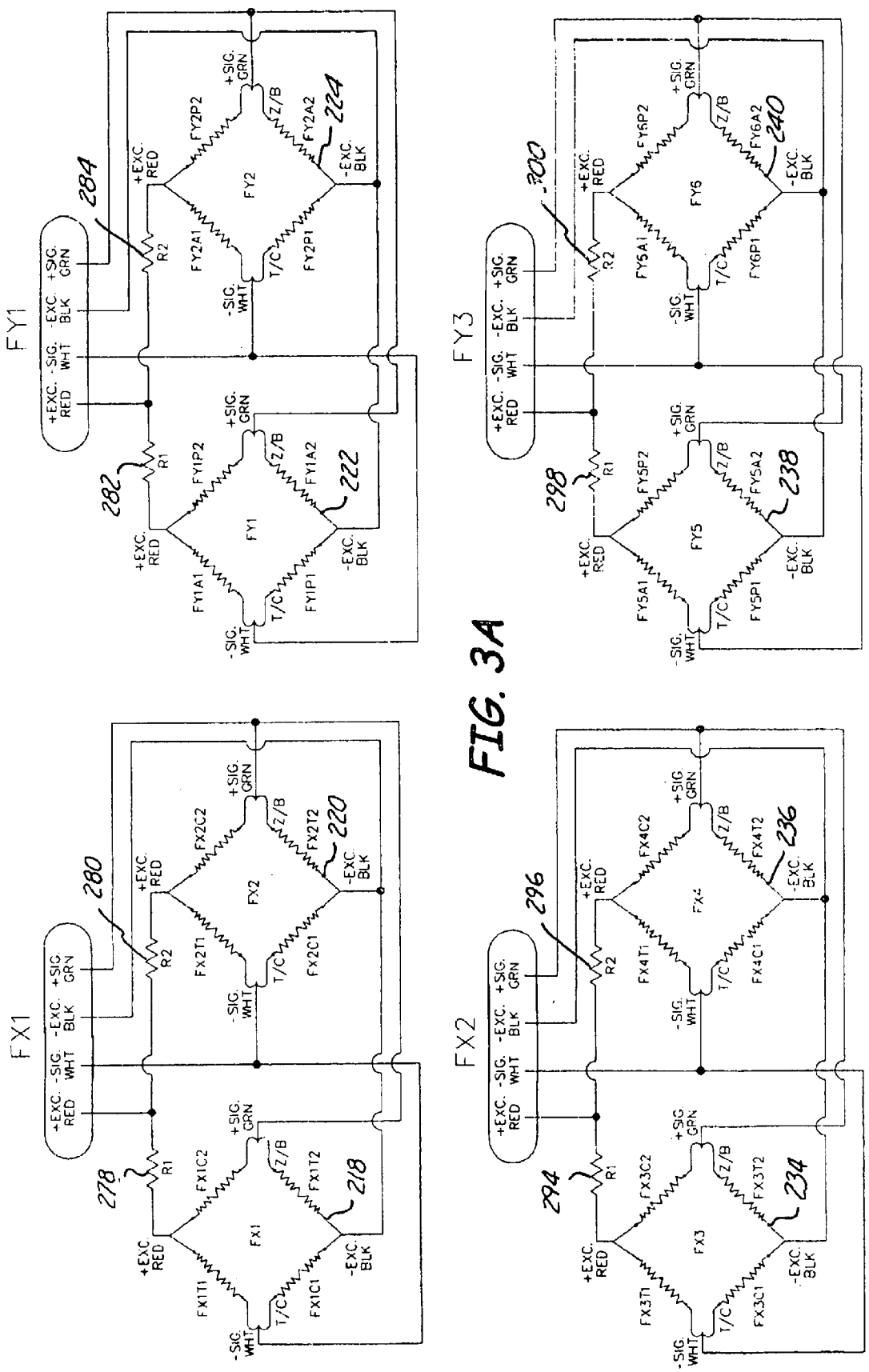
FIGS. 3A and 3B are schematic drawings of electrical circuits used to measure forces and moments about an orthogonal coordinate system.
Figure 3B:
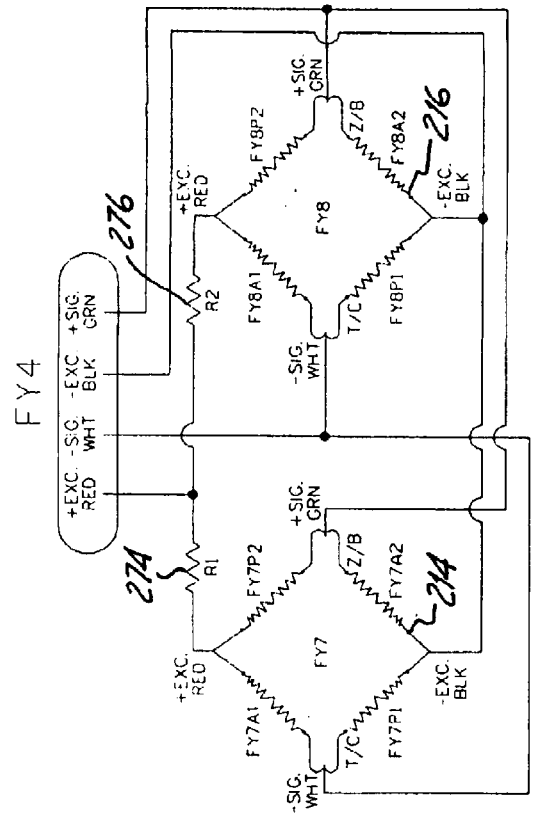
Figure 3B:
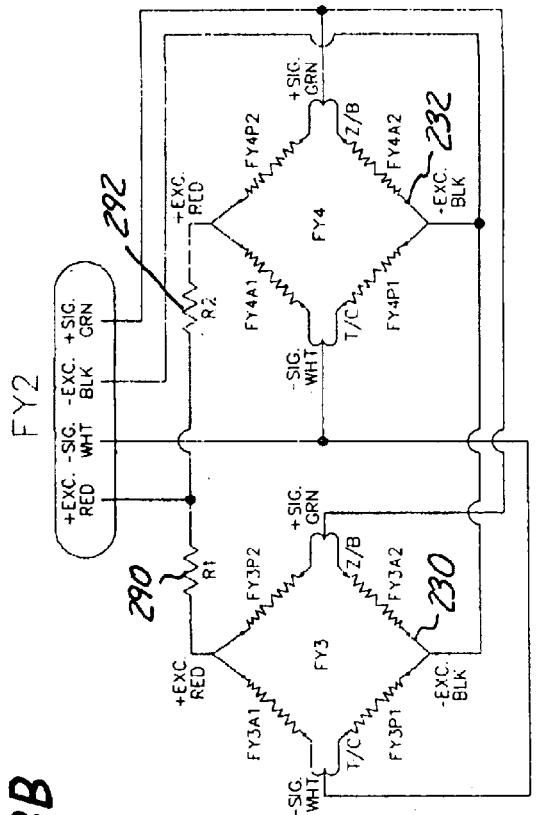
Figure 3B:
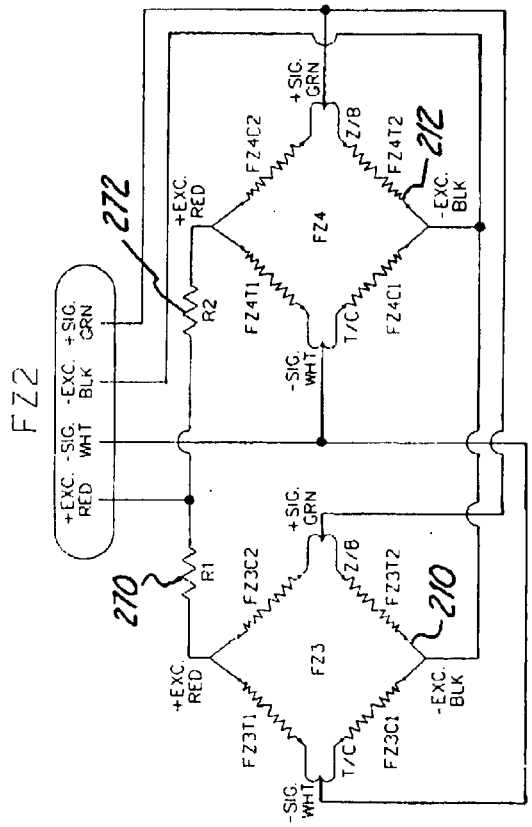
Figure 3B:
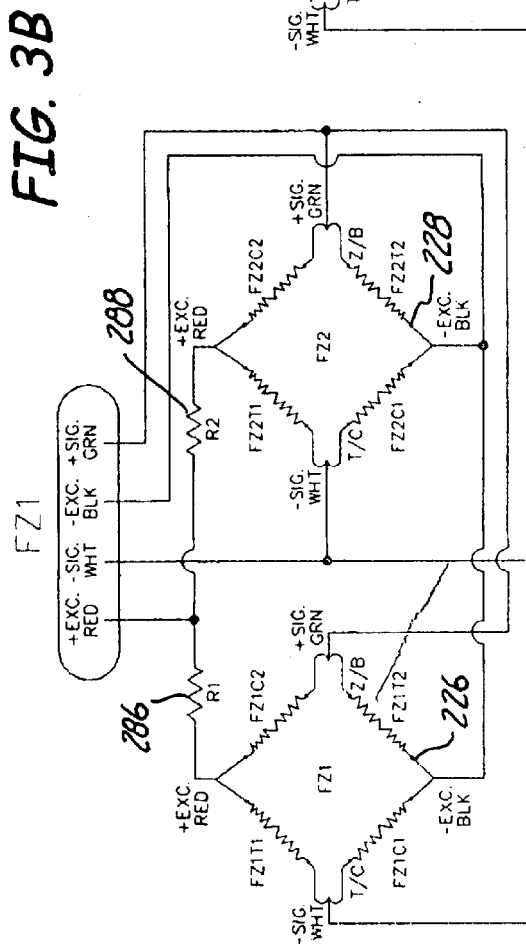

FIGS. 3A and 3B are schematic diagrams illustrating connection of the Wheatstone bridges on tubes 21–28 in order to realize eight output signals from the load cell 10. In essence, pairs of similar sensing Wheatstone bridge circuits are connected together to provide an output signal of a virtual tube disposed between each of the tubes. For instance, a first Wheatstone bridge circuit 218 of tube 21 is indicated at 401 in FIG. 2A, while a first Wheatstone bridge circuit 220 of tube 22 is indicated at 403 in FIG. 2B. The Wheatstone bridges 218 and 220 effectively form a single output signal for a virtual tube 402 located between tubes 21 and 22 in FIGS. 2A and 2B. Resistors 278 and 280 are provided and chosen to match sensitivity of each of the Wheatstone bridge circuits 218 and 220 in order to combine the outputs thereof and effectively form one output signal.

The remaining fourteen Wheatstone bridges are similarly combined in pairs as illustrated in FIGS. 3A and 3B. Specifically, first Wheatstone bridge circuits 226 and 228 of tubes 23 and 24, respectively, are combined to effectively form an output indicated at 405; first Wheatstone bridge circuits 234 and 236 of tubes 25 and 26, respectively, are combined to effectively form an output signal for a tube indicated at 408; first Wheatstone bridge circuits 210 and 212 of tubes 27 and 28, respectively, are combined to effectively form an output signal of a tube indicated at 411; second Wheatstone bridge circuits 222 and 224 of tubes 21 and 22, respectively, are combined to effectively form a second output signal for a tube indicated at 402; second Wheatstone bridge circuits 230 and 232 of tubes 23 and 24, respectively, are combined to effectively form a second output signal for a tube indicated at 405; second Wheatstone bridge circuits 238 and 240 of tubes 25 and 26, respectively, are combined to effectively form a second output signal for a tube indicated at 408; and second Wheatstone bridge circuits 214 and 216 of tubes 27 and 28, respectively, are combined to effectively form a second output signal for a tube indicated at 411. Resistors 270, 272, 274, 276, 282, 284, 286, 288, 290, 292, 294, 296, 298 and 300 are used in a manner similar to resistors 278 and 280 to match sensitivity.

As appreciated by those skilled in the art, it is not necessary that the Wheatstone bridge circuits be combined as illustrated in FIGS. 3A and 3B in order to practice the present invention. In other words, the output signal provided by each Wheatstone bridge can be obtained wherein suitable hardware or software is used to resolve each of the corresponding output signals with respect to the coordinate system of orthogonal axes 33, 35 and 15. However, connection of the Wheatstone bridges as described above and illustrated in FIGS. 2A and 2B can realize manufacturing cost savings by reducing the number of output signals provided from the load cell 10.

In the embodiment illustrated, the load cell 10 provides eight signals as described above. The eight signals are then transformed to provide forces and moments about the axis of the coordinate system 31. Specifically, force along the X-axis 33 is measured as principal strains due to shear stresses created in tubes 21, 22, 25 and 26. This can be represented as:

$$F_x = F_{x1} + F_{x2};$$

where the outputs $F_{x1}$ and $F_{x2}$ are obtained as indicated in FIG. 3A.

Similarly, force along the Z-axis 35 is measured as principal strains due to shear stresses created in the tubes 23, 24, 27 and 28. This can be represented as:

$$F_z = F_{z1} + F_{z2};$$

where the outputs $F_{z1}$ and $F_{z2}$ are obtained as indicated in FIG. 3B.

Force along the Y-axis 15 is measured as axial tension/compression created in all of the tubes 21–28. This can be represented as:

$$F_y = F_{y1} + F_{y2} + F_{y3} + F_{y4}$$

where the outputs $F_{y1}$, $F_{y2}$, $F_{y3}$ and $F_{y4}$ are obtained as indicated in FIGS. 3A and 3B.

An overturning moment about the X-axis is measured as axial tension/compression forces created in tubes 21, 22, 25 and 26 from the opposed forces applied thereto. This can be represented as:

$$M_x = F_{y1} - F_{y3}.$$

Note, that the outputs indicative of $F_{y2}$ and $F_{y4}$ are effectively zero since each of these outputs are formed from tubes on each side of the X-axis 33.

Likewise, an overturning moment about the Z-axis 35 is measured as axial tension/compression created in tubes 23, 24, 27 and 28 from the opposed forces applied thereto. This can be represented by:

$$M_z = F_{y4} - F_{y2}.$$

Note that for a moment about the Z-axis 35, the outputs $F_{y1}$ and $F_{y3}$ are zero.

An overturning moment about the Y-axis 15 is measured as principal strains due to shear stresses created in all of the tubes 21–28. This can be represented as:

$$M_y = (F_{x1} - F_{x2}) + (F_{z1} - F_{z2}).$$

It should be understood that the number of sensors 30 and the number of sensing circuits can be reduced if measured forces and moments of less than six degrees of freedom is desired.

Figure 4A:
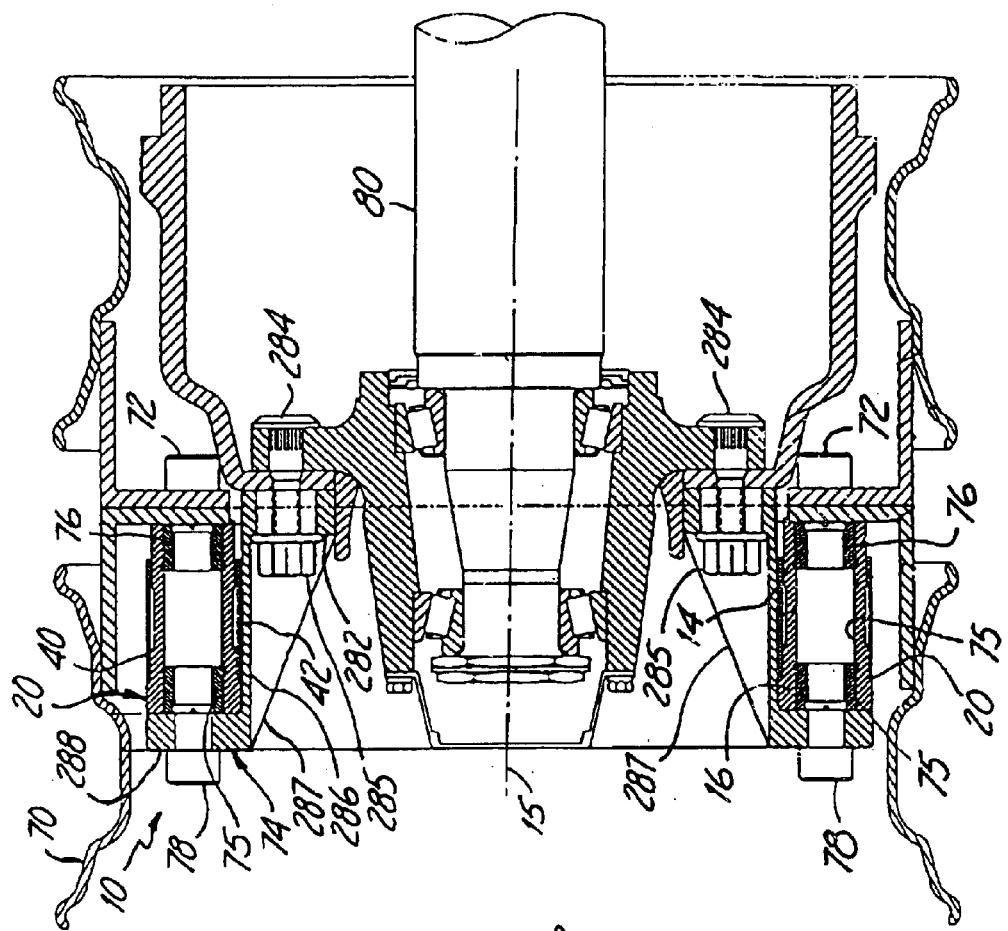
FIG. 4A is a sectional view of the load cell mounted to a tire rim.
Figure 4B:
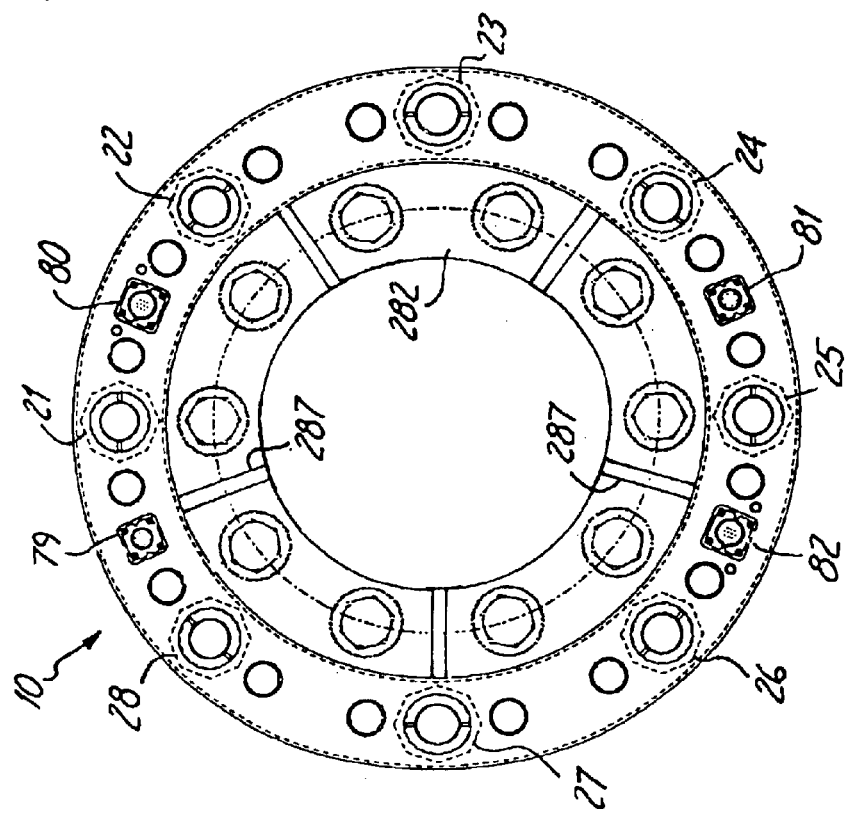
FIG. 4B is a front elevational view of the transducer.

The load cell 10 is particularly well-suited for measuring the force and moment components of a rolling wheel. Referring to FIGS. 4A and 4B, the load cell 10 is illustrated as being connected in the load path from a vehicle spindle 80 to a wheel rim 70. In effect, the load cell 10 replaces a center portion of the rim 70.

As illustrated, the tubes 20 are each oriented substantially parallel to a spindle axis corresponding substantially to the Y-axis 15. Having the tubes 20 oriented as such allows the load cell 10 to carry larger moments as the tubes 20 are in tension/compression loading versus the bending/shear loading of a regularly oriented sensing element such as disclosed in U.S. Pat. No. 5,969,268. In addition, many vehicles such as medium and heavy-duty trucks have rims with large lug nut bolt circles (fasteners used to mount the truck rim to the spindle) and relatively small rim diameters, which do not allow use of radially oriented sensing members such as disclosed in U.S. Pat. No. 5,969,268. In contrast, the load cell 10 as illustrated has a relatively large inside diameter to accommodate the large lug nut bolt circles, and a relatively small outside diameter to allow fastening to the vehicle rim.

As illustrated in FIGS. 4A and 4B, the first annular ring 14 is secured to the rim 70, while a hub adapter 74 joins the second annular ring 16 to a vehicle spindle 80. Fasteners 72 joining the rim 70 to the first annular ring 14 can be secured at any desired location in the first annular ring 14; however, in order to concentrate loading directly into each of the tubes 20, it may be preferable to secure the fasteners 72 to the first annular ring 14 so as to be oriented in line with a bore 75 of each of the tubes 20. In the embodiment illustrated, each aperture of the first annular ring 14 is aligned with an opening to a bore 75 of each tube 21–28 and includes a mounting element 76 that is secured in the corresponding aperture. For instance, as illustrated, the mounting element 76 can comprise a threaded plug that engages threads provided in the corresponding aperture in the first annular ring 14. The fastener 72 can then threadably mate with threads provide in the mounting element 76. If desired, the mounting element 76 can be secured in the aperture by other means such as welding, braising, gluing, bonding or the like. Raised portions 39 extending slightly above surface 36 of annular ring 14 can be provided to concentrate stresses thereon proximate each tube 21–28 (FIG. 1B). Similar raised portions can be provided for mounting the load cell body 10 to rim 70. Extending flanges 41 can be provided to center the load cell body 10 on the rim 70 (FIG. 1A).

The second annular ring 16 can be secured to the hub adapter 74 in a manner similar to connection of the first annular ring 14 to the rim 70. In the embodiment illustrated, fasteners 78 secure the hub adapter 74 to the second annular ring 16 using a mounting element 75 similar to mounting element 76. The hub adapter 74 transmits loads between the load cell 10 and the vehicle spindle 80. The hub adapter 74 includes an inner annular ring 282 having apertures that can receive studs 284 present on the vehicle spindle 80 wherein lug nuts 285 secure the hub adapter 74 to the vehicle spindle 80. A cylindrical portion 286 with reinforcing ribs 287 joins the inner ring 282 to an outwardly radially extending flange 288 or ring portion, which is secured to the load cell 10 as described above.

Outer cylindrical cover 40 and inner cylindrical cover 42 can also be provided on load cell 10 in order to protect the plurality of tubes 20. Outer cover 40 and inner cover 42 can be secured and bridged between first annular ring 14 and second annular ring 16. Covers 40 and 42 can be secured on the load cell body using adhesive such as silicone or other suitable fasteners that allow flexibility, yet prevent unwanted entry of dirt or other objects from coming into contact with the plurality of tubes 20 and, in particular, the plurality of sensors 30. The covers 40 and 42 used in this manner form a sealed chamber for the tubes 21–28.

Figure 5:
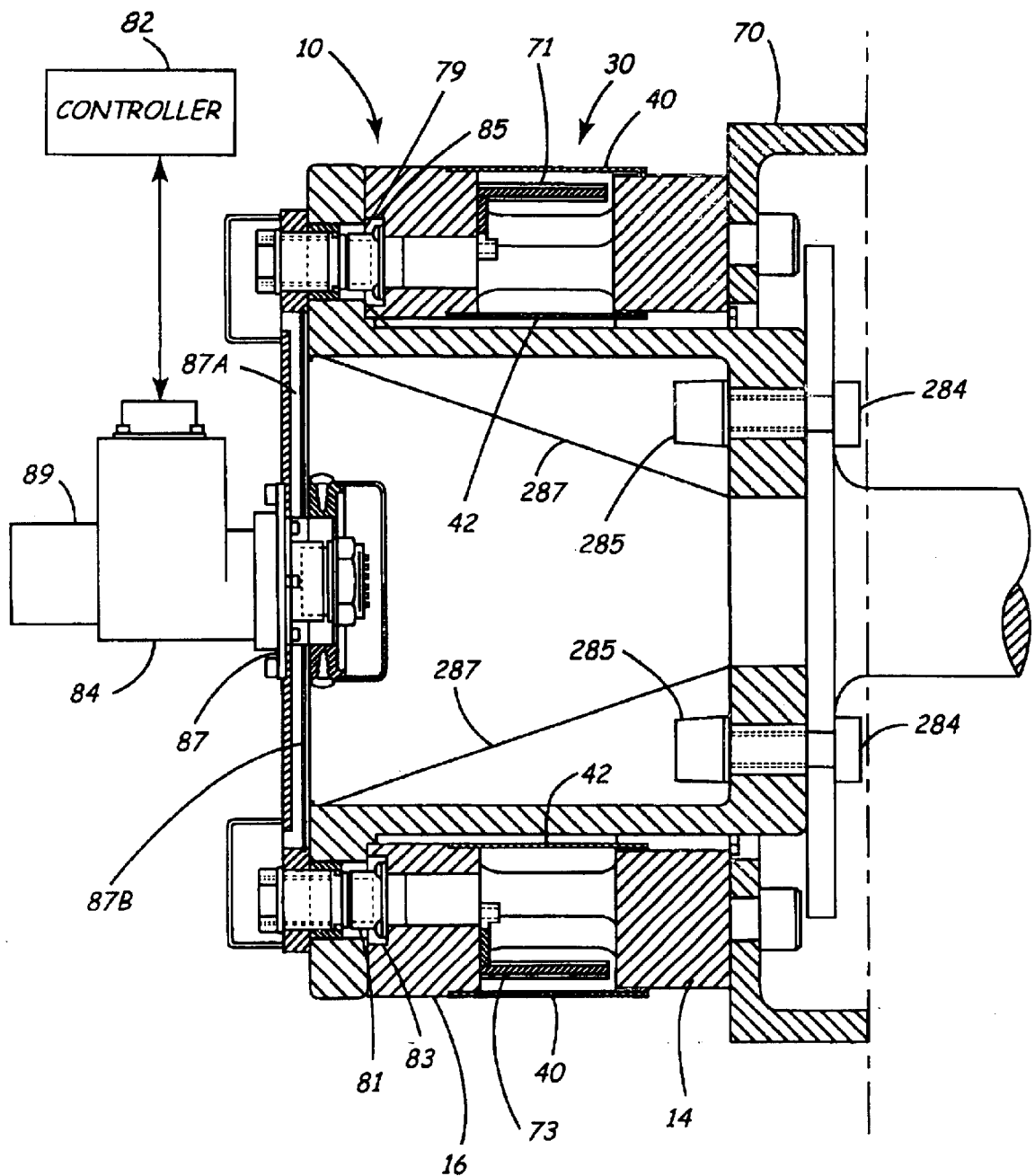
FIG. 5 is a sectional view of the load cell mounted to the tire rim and including a slip ring assembly.

Referring to FIG. 5, power is supplied to and output signals are obtained from the plurality of sensors 30 by a controller 82 through a slip ring assembly 84, if the tire rim 70 rotates or partially rotates. The controller 82 calculates, records and/or displays the force and moment components measured by the load cell 10.

Load cell 10 includes amplifying circuits 71 and 73. The amplifying circuits 71 and 73 are connected to the plurality of sensors 30 on the tubes 21–28 and amplify the output signals prior to transmission through the slip ring assembly 84. By amplifying the output signals, problems associated with noise introduced by the slip ring assembly 84 are reduced. Referring to FIGS. 4B and 5, connectors 79, 80, 81 and 82 mounted in apertures 83, 84, 85 and 86, respectively, connect the amplifying circuits 71 and 73 to the slip ring assembly 84. A mounting plate 87 mounts the slip ring assembly 84 to the second annular ring 16. Passageways such as 87A and 87B are provided in the mounting plate 87 to carry conductors from the slip ring assembly 84 to the connectors 79 and 81. An encoder 89 provides an angular input signal to the controller 82 indicative of the angular position of the load cell 10.

Figure 6:
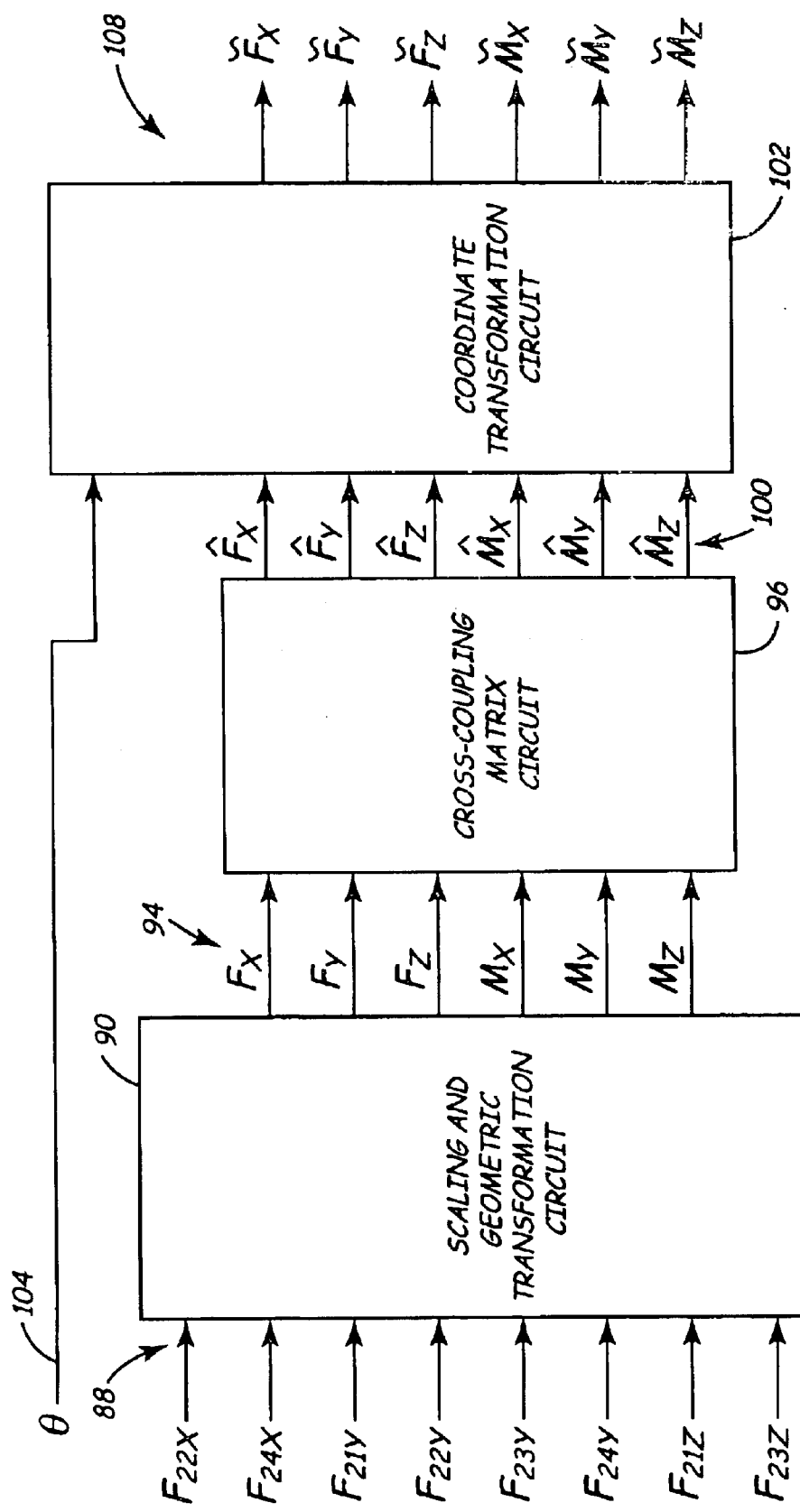
FIG. 6 is a general block diagram of a controller.

FIG. 6 illustrates generally operation performed by the controller 82 to transform the output signals 88 received from the individual sensing circuits on the tubes 21–28 to obtain output signals 108 indicative of force and moment components with respect to six degrees of freedom in a static orthogonal coordinate system. As illustrated, output signals 88 from the sensing circuits are received by a scaling and geometric transformation circuit 90. The scaling and geometric transformation circuit 90 adjusts the output signals 88 to compensate for any imbalance between the sensing circuits. Circuit 90 also combines the output signals 88 according to the equations given above to provide output signals 94 indicative of force and moment components for the orthogonal coordinate system.

Referring back to FIG. 6, a cross-coupling matrix circuit 96 receives the output signals 94 and adjusts the output signals so as to compensate for any cross-coupling effects. A coordinate transformation circuit 102 receives output signals 100 from the cross-coupling matrix circuit 96 and an angular input 104 from an encoder or the like. The coordinate transformation circuit 102 adjusts the output signals 100 and provides output signals 108 that are a function of a position of the load cell 10 so as to provide force and moment components with respect to a static orthogonal coordinate system.

Figure 7:
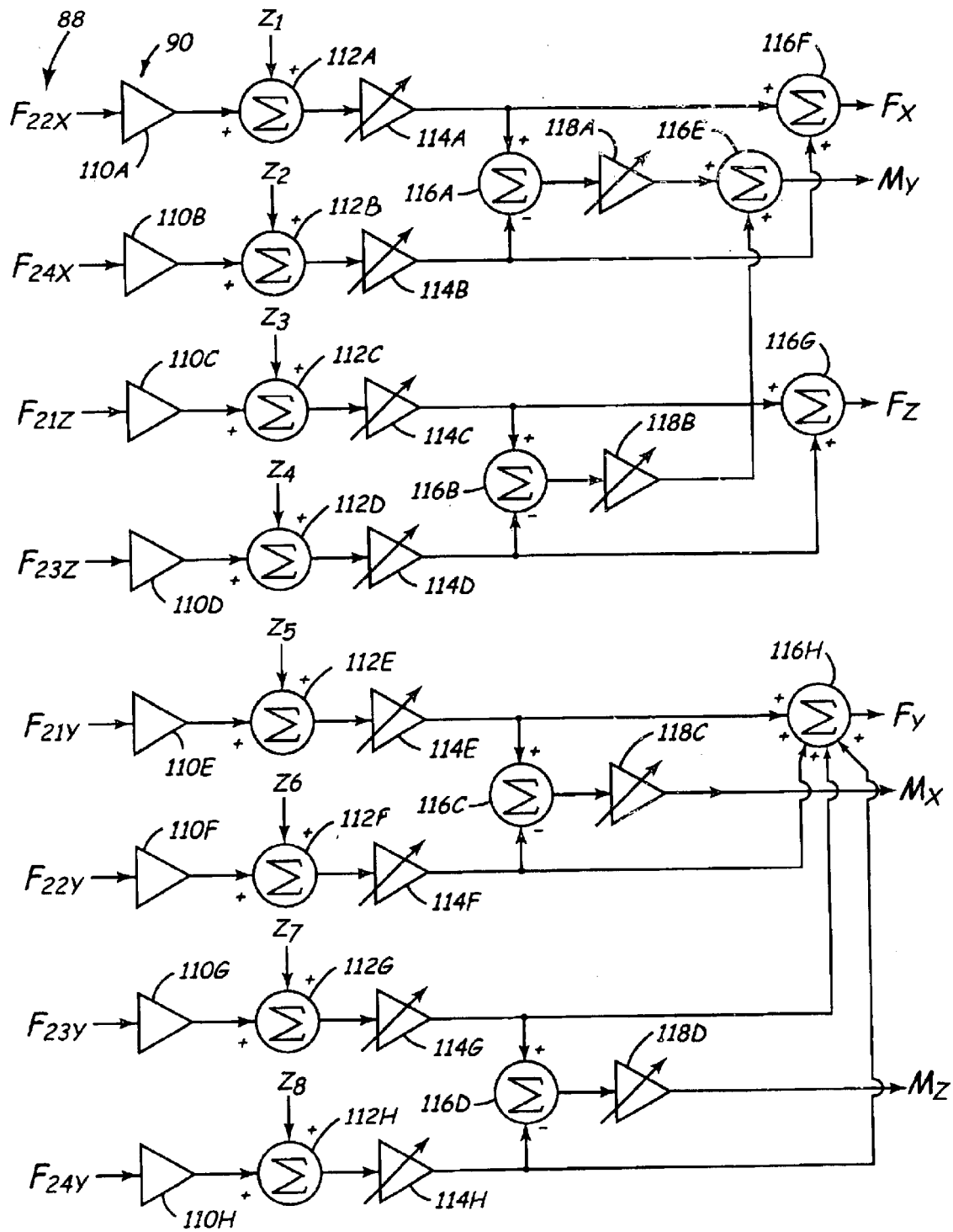
FIG. 7 is a block diagram of a scaling and geometric transformation circuit.

FIG. 7 illustrates the scaling and geometric transformation circuit 90 in detail. High impedance buffer amplifiers 110A to 110H receive the output signals 88 from the slip ring assembly 84. In turn, adders 112A to 112H provide a zero adjustment while, preferably, adjustable amplifiers 114A to 114H individually adjust the output signals 88 so that any imbalance associated with physical differences such as variances in the wall thickness of the location of the strain sensors 30 on the tubes 21–28 or variances in the placement of the sensors 30 from tube to tube can be easily compensated. Adders 116A to 116H combine the output signals from the amplifiers 114A to 114H in accordance with the equations above. Adjustable amplifiers 118A to 118D are provided to ensure that output signals from adders 116A to 116D have the proper amplitude.

Figure 8:
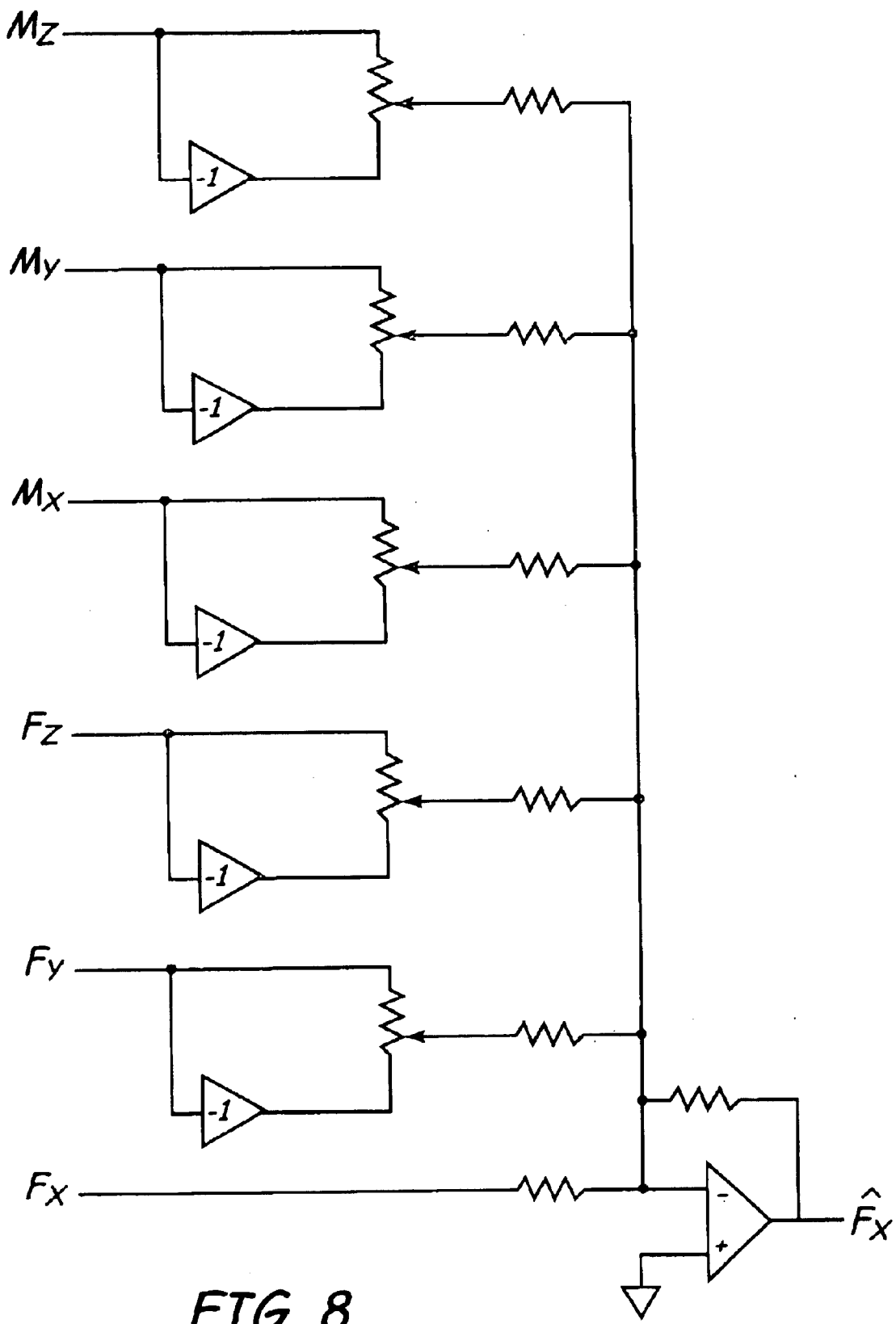
FIG. 8 is a circuit diagram of a portion of a cross coupling matrix circuit.

As stated above, cross-coupling compensation is provided by circuit 96. By way of example, FIG. 8 illustrates cross-coupling compensation for signal $F_x$. Each of the other output signals $F_y$, $F_z$, $M_x$, $M_y$, and $M_z$ are similarly compensated for cross-coupling effects.

Figure 9:
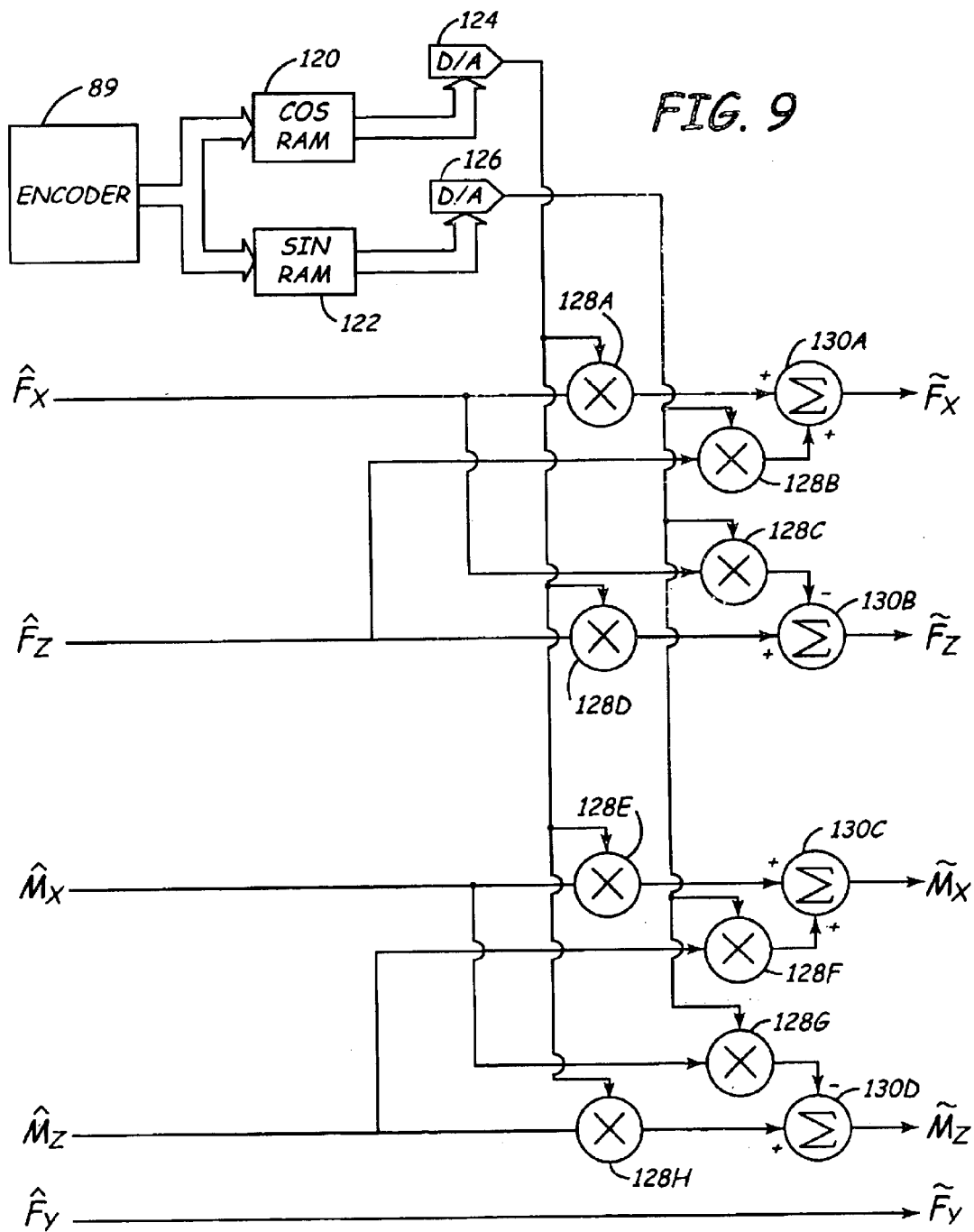
FIG. 9 is a block diagram of a coordinate transformation circuit.

FIG. 9 illustrates in detail the coordinate transformation circuit 102. The encoder 89 provides an index for sine and cosine digital values stored in suitable memory 120 and 122 such as RAM (Random Access Memory). Digital to analog converters 124 and 126 received the appropriate digital values and generate corresponding analog signals indicative of the angular position of the load cell 10. Multipliers 128A to 128H and adders 130A to 130D combine force and moment output signals along and about the X-axis and the Z-axis so as to provide force and moment output signals 108 with respect to a static orthogonal coordinate system.

Figure 10A:
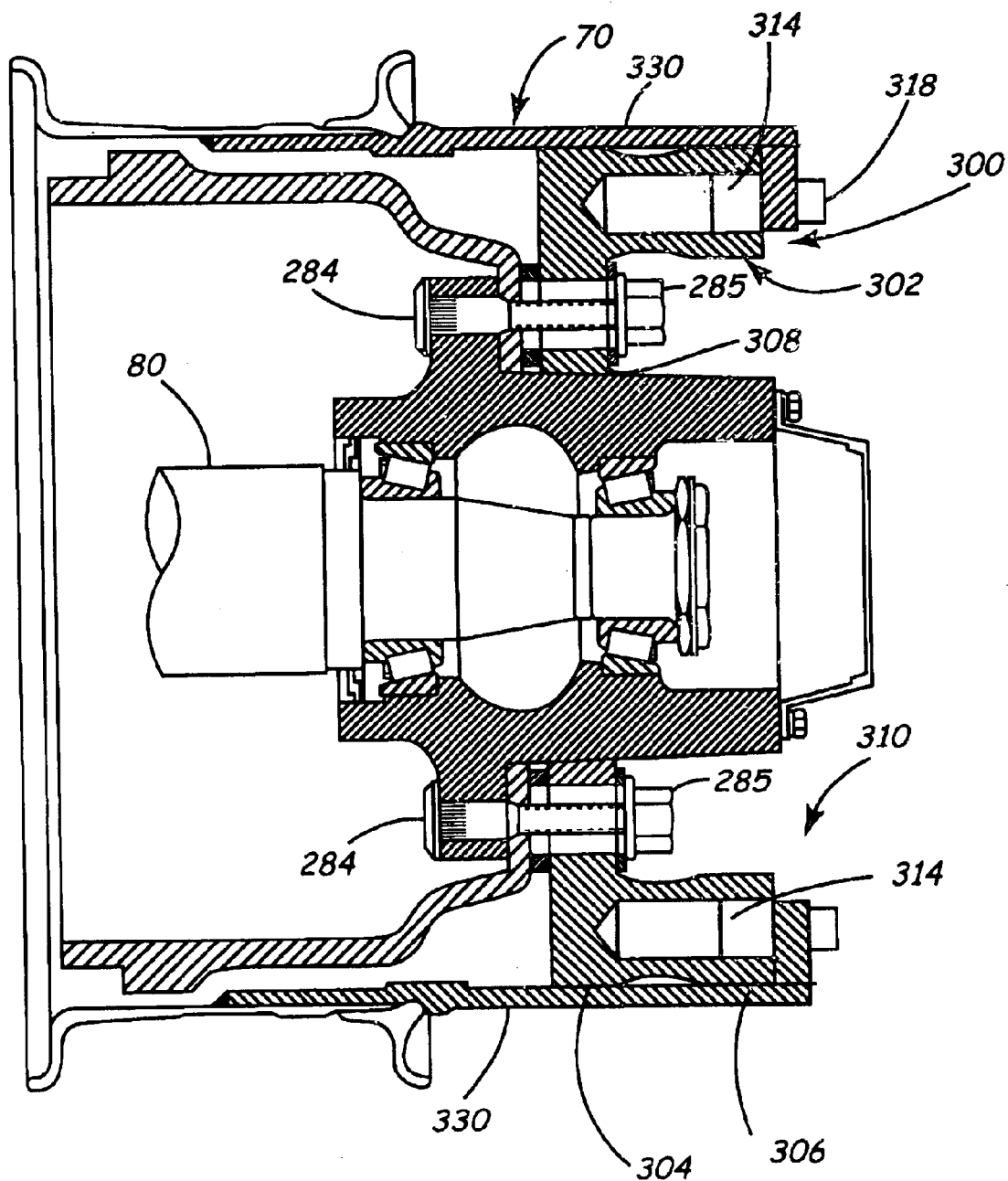
FIG. 10A is a sectional view of a second embodiment of a load cell mounted to a tire rim.
Figure 10B:
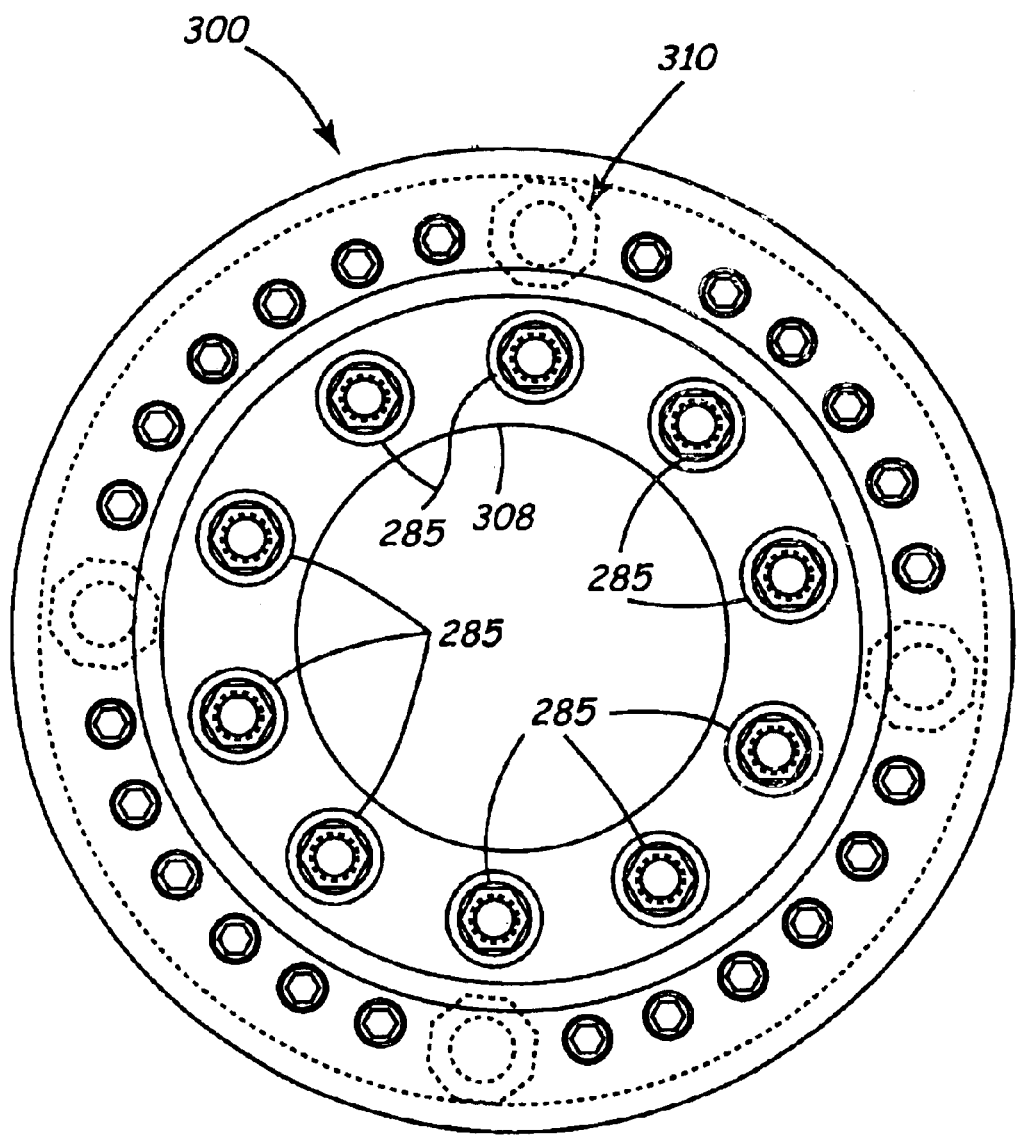
FIG. 10B is a front elevational view of a second embodiment of a load cell.

At this point, it should be noted that the load cell 10 of the present invention is not limited to the embodiment illustrated in FIGS. 1–5. FIGS. 10A and 10B illustrate another form of a load cell 300 that can also be used for measuring force and moment components of a rolling wheel. Like the load cell 10 described above, the load cell 300 also includes an integral body 302 formed of a first ring member 304, a second ring member 306 and a plurality of sensing tubes 310 joining the first ring member 304 to the second ring member 306. Tubes 310 are constructed in a manner similar to that described above and include sensing elements as described above. However, in this embodiment, the first annular ring 304 includes a mounting flange 308 extending radially inwardly that can be used to secure the load cell 300 directly to the vehicle spindle 80. Specifically, the annular ring 304 includes apertures that receive the studs 284 of the vehicle spindle wherein lug nuts 285 secure the annular ring 304 to the vehicle spindle 80. In this embodiment, a cylindrical rim extender 330 joins the second annular ring 306 to the vehicle rim 70 and can be mounted to the second annular ring 306 in a manner similar to that described above with fastener 318 wherein mounting elements 314 are provided in apertures opening to bores forming each of the plurality of tubes. Otherwise, other fastening techniques such as welding can be used although some form of removable fastener is generally preferred.

Figure 11:
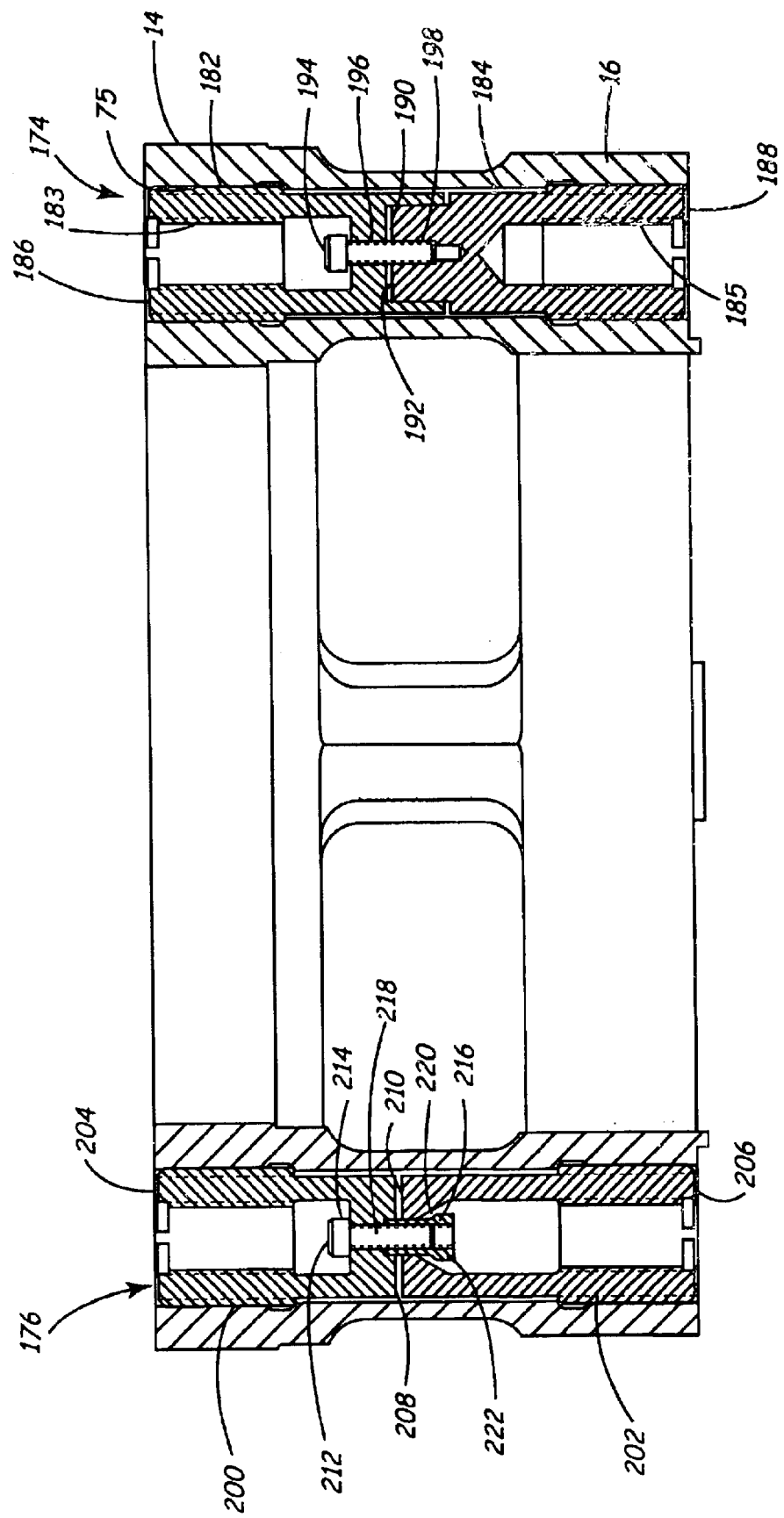
FIG. 11 is a cross-sectional view illustrating two embodiments of overtravel stop assemblies.

FIG. 11 illustrates two embodiments of overtravel stop assemblies 174 and 176 that can be incorporated into the loads cell 10 and 300, if desired. Referring first to overtravel stop assembly 174, the assembly includes extension elements 182 and 184 secured within the bore 75 extending from the first annular ring 14 to the second annular ring 16. First ends 186 and 188 of each extension element 182 and 184, respectively, are secured to the first annular ring 14 and the second annular ring 16, respectively. The extension elements 182 and 184 extend toward each other within the bore 170 such that ends 190 and 192 are positioned proximate each other. In the embodiment illustrated, extension element 182 includes a recess having a shape and size suitable for receiving the end 192 with slight clearance. A fastener 194 such as a threaded bolt herein depicted, limits axial displacement of the extension elements 182 and 184 away from each other. The fastener extends through a bore 196 provided in the extension element 182 with slight clearance and is secured to the extension element 184 with a threaded aperture 198.

Extension elements 182 and 184 can be secured within corresponding apertures of the first annular ring 14 and the second annular ring 16 using conventional techniques such as welding, braising, bonding or gluing. In the embodiment illustrated, mating threads formed on the extension elements 182 and 184 and on apertures formed in the first annular ring 14 and the second annular ring 16 are used to secure the elements. Fasteners 72 and 78 can threadably mate with threads 183 and 185 in manner discussed above with respect to mounting element 75 and 76.

Extension elements 182 and 184 can also act as a thermal conductive shunt between the first annular ring 14 and the second annular ring 16 in addition to functioning as an overtravel stop. If desired, a thermally conductive grease can be provided between ends 190 and 192 in order to enhance thermal conductivity.

Assembly 176 is similar to assembly 174 and includes extension elements 200 and 202 having first ends 204 and 206 thereof secured to the first annular ring 14 and the second annular ring 16, while second ends 208 and 210 thereof are positioned proximate each other. In this embodiment, a fastener 212 comprises a threaded bolt 214 and a threaded nut 216. The fastener 212 extends through a bore 218 formed in the second end 208 of the extension element 200 with slight clearance. The nut 216 also extends through a bore 220 formed in the second end of the extension element 202 with slight clearance. The nut 216 is secured to the extension element 202 with the bolt 214. The nut 216 includes a portion 222 comprising an extending flange of size greater than the bore 220 of extension element 202. Contact of the extending flange of the nut 216 with an inner wall of the bore 220, herein conically shaped, will limit axial displacement of the extension elements 200 and 220 away from each other.

It should be noted that whether functioning as an overtravel stop and/or a thermal conductive shunt, either of the assemblies 174 and 176 can be incorporated in tubular sensing structures such as a plurality of tubes 20 of the load cell 10 herein illustrated, or in other load cells having tubular sensing structures such as disclosed in U.S. Pat. No. 5,969,268 (the content of which is herein incorporated by reference in its entirety) wherein the load cell includes radially oriented tubes extending from a center hub to an annular ring.

Although illustrated wherein the second ends 190, 192, 209 and 210 are approximately disposed at the midpoint of each corresponding tube, those skilled in the art will appreciate that this is not necessary and that positioning of the ends of the elements can be disposed anywhere along the length of the bore formed in the tubes. The load cell 300 of FIGS. 10A and 10B could also include the assemblies 174 and 176, if the bores forming the tubes 304 are extended through the first annular ring 304.

Although the present invention has been described with reference to preferred embodiments, workers skilled in the art will recognize that changes may be made in form and detail without departing from the spirit and scope of the invention.

What is claimed is:

1. A load cell body for transmitting forces and moments in a plurality of directions, the load cell body comprising:
an integral assembly having:
a first ring member and a second ring member, each ring member having a central aperture centered on a reference axis;
at least three tubes extending from the first ring member to the second ring member parallel to the reference axis; and
wherein the first ring member includes an aperture aligned with an opening to a bore in each of the tubes.

2. The load cell body of claim 1 and further comprising sensors mounted on selected tubes.

3. The load cell body of claim 2 wherein the sensors comprise shear sensors and axial tension/compression sensors mounted to each tube.

4. The load cell body of claim 2 wherein an outer surface of each tube includes a plurality of opposed surfaces and wherein the sensors are mounted to the opposed surfaces.

5. The load cell body of claim 4 wherein the outer surface comprises a first pair of surfaces facing in opposite directions and a second set of surfaces facing in opposite directions, the second set of surfaces being substantially orthogonal to the first set of surfaces such that the surfaces of the first set and the second set are alternately disposed about each corresponding longitudinal axis and wherein the sensors are mounted to the surfaces of the first and second sets of surfaces.

6. The load cell body of claim 5 wherein eight tubes join the first ring member to the second ring member, and wherein opposed surfaces of adjacent pairs of tubes are aligned such that the first pair of opposed surfaces face the same direction and the second pair of opposed surfaces face the same direction.

7. The load cell body of claim 6 wherein each of the opposed surfaces is planar.

8. The load cell body of claim 6 wherein the outer surfaces of each tube form an octagon.

9. The load cell body of claim 6 wherein the sensors comprise a set of shear sensors mounted on the first set of opposed surfaces comprising a shear sensing circuit for each tube, and a set of axial tension/compression sensors mounted on the second set of opposed surfaces comprising a axaial tension/compression sensing circuit for each tube.

10. The load cell body of claim 9 wherein the shear sensing circuits of each of said adjacent pairs of tubes are electrically coupled to provide an output signal, and wherein the axial tension/compression sensing circuits of each of said adjacent pairs of tubes are electrically coupled to provide an output signal.

11. The load cell body of claim 2 wherein the sensors comprise bending sensors.

12. The load cell body of claim 1 wherein the second ring member includes an aperture aligned with an opening to each bore of the tubes.

13. The load cell body of claim 12 wherein at least some of the apertures in the first and second ring members aligned with the bores include mounting threads.

14. The load cell body of claim 1 and further comprising:
a mounting hub including a first annular rim joined to the first ring member, a second annular rim including a plurality of bores extending there through and a cylindrical support extending between the first annular rim and the second annular rim.

15. The load cell body of claim 1 wherein an outer surface of each tube is non-rectangular.

16. The load cell body of claim 1 wherein at least some of the apertures in the first ring member aligned with the bores include mounting threads.

17. A load cell body for transmitting forces and moments in a plurality of directions, the load cell body comprising:
an integral assembly having:
a first ring member and a second ring member, each ring member having a central aperture centered on a reference axis; and
at least three tubes extending from the first ring member to the second ring member parallel to the reference axis;
an inner cylindrical wall plate joined to at least one of the first and second ring members; and
an outer cylindrical wall plate joined to at least one of the first and second ring members, wherein the plurality of tubes are disposed between the inner and outer cylindrical wall plates.

18. The load cell body of claim 17 wherein inner and outer cylindrical wall plates are joined to the first and second ring members to form a sealed chamber.

19. The load cell body of claim 17 and further comprising sensors mounted on selected tubes.

20. The load cell body of claim 19 wherein the sensors comprise shear sensors and axial tension/compression sensors mounted to each tube.

21. The load cell body of claim 19 wherein an outer surface of each tube includes a plurality of opposed surfaces and wherein the sensors are mounted to the opposed surfaces.

22. The load cell body of claim 21 wherein the outer surface comprises a first pair of surfaces facing in opposite directions and a second set of surfaces facing in opposite directions, the second set of surfaces being substantially orthogonal to the first set of surfaces such that the surfaces of the first set and the second set are alternately disposed about each corresponding longitudinal axis and wherein the sensors are mounted to the surfaces of the first and second sets of surfaces.

23. The load cell body of claim 22 wherein eight tubes join the first ring member to the second ring member, and wherein opposed surfaces of adjacent pairs of tubes are aligned such that the first pair of opposed surfaces face the same direction and the second pair of opposed surfaces face the same direction.

24. A load cell body for transmitting forces and moments in a plurality of directions, the load cell body comprising:
an integral assembly having:
a first ring member and a second ring member, each ring member having a central aperture centered on a reference axis; and
at least three tubes extending from the first ring member to the second ring member parallel to the reference axis; and
an overtravel limit assembly extending within a bore of a tube.

25. The load cell body of claim 24 wherein the overtravel limit assembly comprises a first extension joined to the first ring member and a second extension joined to the second ring member, a coupling device selectively coupling the first and second extension members to limit displacement of the first extension from the second extension.

26. The load cell body of claim 25 wherein the first extension member and the first ring member include mating threads and the second extension member and the second ring member include mating threads.

27. The load cell body of claim 26 wherein the first and second extension members each include central recesses with inner threads.

* * * * *